(12) United States Patent
de Bes

(10) Patent No.: US 11,444,919 B2
(45) Date of Patent: Sep. 13, 2022

(54) MISSION CRITICAL SECURITY ZONE

(71) Applicant: Woodward, Inc., Fort Collins, CO (US)

(72) Inventor: Jacob A. de Bes, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 410 days.

(21) Appl. No.: 16/417,063

(22) Filed: May 20, 2019

(65) Prior Publication Data

US 2020/0374266 A1 Nov. 26, 2020

(51) Int. Cl.
| | | |
|---|---|---|
| *G06F 9/00* | (2006.01) | |
| *G06F 15/16* | (2006.01) | |
| *G06F 17/00* | (2019.01) | |
| *H04L 9/40* | (2022.01) | |

(52) U.S. Cl.
CPC ...... *H04L 63/0209* (2013.01); *H04L 63/0227* (2013.01)

(58) Field of Classification Search
CPC ............. H04L 63/0209; H04L 63/0227; H04L 63/0218
USPC .......................................................... 726/11
See application file for complete search history.

(56) References Cited

U.S. PATENT DOCUMENTS

| | | | |
|---|---|---|---|
| 5,896,499 A | 4/1999 | McKelvey | |
| 6,330,648 B1 | 12/2001 | Wambach et al. | |
| 6,938,115 B2* | 8/2005 | Johansson | G06F 13/102 |
| | | | 710/200 |
| 7,392,398 B1 | 6/2008 | Shakkarwar | |
| 7,523,281 B2 | 4/2009 | Madathilparambil et al. | |
| 7,761,923 B2 | 7/2010 | Khuti et al. | |
| 8,060,925 B2* | 11/2011 | Yoshii | G06F 21/57 |
| | | | 713/168 |
| 8,082,585 B1 | 12/2011 | Givonetti | |
| 8,239,959 B2 | 8/2012 | Gellerich | |
| 8,832,833 B2 | 9/2014 | Demopoulos et al. | |
| 9,531,671 B2 | 12/2016 | Ellis | |
| 10,002,245 B2 | 6/2018 | Newman et al. | |
| 2005/0032549 A1* | 2/2005 | Kawaguchi | H04M 1/72412 |
| | | | 455/552.1 |
| 2011/0275360 A1* | 11/2011 | Sample | H04W 12/02 |
| | | | 455/422.1 |
| 2013/0347095 A1* | 12/2013 | Barjatiya | H04L 61/6022 |
| | | | 726/13 |

(Continued)

FOREIGN PATENT DOCUMENTS

CN 102054141 5/2011

*Primary Examiner* — Jeffrey C Pwu
*Assistant Examiner* — Samuel Ambaye
(74) *Attorney, Agent, or Firm* — Fish & Richardson P.C.

(57) ABSTRACT

The subject matter of this specification can be embodied in, among other things, a computer system that includes a first processor system configured to communicate with a network, a second processor system configured to control a process, and a third processor system configured to selectively operate in a first configuration and a second configuration, wherein the third processor system is configured to selectively block predetermined types of communications from the first processor system to the second processor system in the first configuration, and the third processor system is configured to permit the predetermined types of communications from the first processor system to the second processor system in the second configuration.

21 Claims, 4 Drawing Sheets

(56) References Cited

U.S. PATENT DOCUMENTS

| | | | |
|---|---|---|---|
| 2014/0223536 A1* | 8/2014 | Matsushima | H04L 63/08 |
| | | | 709/217 |
| 2015/0335244 A1 | 11/2015 | Guiney et al. | |
| 2016/0006796 A1* | 1/2016 | Matsushima | H04L 63/0227 |
| | | | 709/217 |
| 2017/0235944 A1* | 8/2017 | Newman | G06F 12/1433 |
| | | | 711/163 |
| 2017/0357801 A1 | 12/2017 | Sanchez | |
| 2018/0077156 A1* | 3/2018 | Ellingson | H04L 63/0853 |

* cited by examiner

MISSION CRITICAL SECURITY ZONE

TECHNICAL FIELD

This instant specification relates to computer security, more specifically for securing computer hardware from malicious communications.

BACKGROUND

Computer security involves the protection of computer systems from malicious or accidental damage, disruption, misdirection, theft, exposure, or other unwanted acts performed upon electronic systems, computers, and/or information.

One type of attack is a denial-of-service attack. In these types of attacks, unauthorized users may overwhelm the capabilities of a computer or communications bus in order to cause the system to become unavailable to others or for its primary task.

Another type of attack is a stack buffer overrun attack. In these types of attacks, more data is written to a buffer than there is room allocated for that buffer. This can cause corruption of adjacent data on the stack and will often cause the system to crash or operate incorrectly. In some cases, such incorrect operation can allow a malicious user to gain access to or control of resources that would normally be secure.

Yet another type of attack is a simple impersonation attack, in which an unauthorized person uses stolen or discovered credentials (e.g., a stolen password) of an authorized user in order to gain access to a system. In such attacks, the target system is accessed through the same vector as would be used by an authorized user, such as a communications (e.g., network) bus.

SUMMARY

In general, this document describes systems and techniques for providing computer security, more specifically for securing computer hardware from malicious communications.

In a general aspect, a computer system includes a first processor system configured to communicate with a network, a second processor system configured to control a process, and a third processor system configured to selectively operate in a first configuration and a second configuration, wherein the third processor system is configured to selectively block predetermined types of communications from the first processor system to the second processor system in the first configuration, and the third processor system is configured to permit the predetermined types of communications from the first processor system to the second processor system in the second configuration.

Various implementations can include some, all, or none of the following features. The third processor system can be further configured to determine a status of a user input and operate in the first configuration and the second configuration based on the status of the user input. The user input can include a physical selector in electrical communication with the third processor system. The user input can be located in physical proximity to the at least one of the second processor system and the third processor system. The predetermined types of communications can include communications that can cause a change in the operations of the second processor system. The third processor system can be further configured to reply to the predetermined types of communications when operating in the first configuration. The third processor system can be further configured to identify communications including information configured to alter operations of the second processor system. The third processor system can include a field programmable gate array (FPGA) device.

In another general aspect, a non-transitory computer storage medium is encoded with a computer program, the program having instructions that when executed by data processing apparatus cause the data processing apparatus to perform operations including determining a first operational condition, receiving, from a first processing system, a first communication comprising information configured to alter operations of a second processing system, blocking, based on the first operational condition, the first communication from being communicated to the second processing system, determining a second operational condition, receiving, from the first processing system, a second communication comprising information configured to alter operations of the second processing system, and allowing, based on the second operational condition, the second communication to be communicated to the second processing system.

Various implementations can include some, all, or none of the following features. The operations can also include receiving, from the first processing system, a third communication having information not configured to alter operations of the second processing system, and allowing the third communication to be communicated to the second processing system in the first operational condition or the second operational condition. Determining the first operational condition can also include receiving a first user input indicative of a user selection of the first operational configuration, and determining the second operational condition can also include receiving a second user input indicative of a user selection of the second operational configuration. The first user input can be based on actuation of a physical selector to a first mechanical configuration, and the second user input can be based on actuation of the physical selector to a second mechanical configuration. The operations can also include sending, based on the first operational condition, a third communication including a response to the first communication. The operations can also include determining that the first communication comprises information configured to alter operations of the second processing system. The data processing apparatus can include a field-programmable gate array (FPGA) device, and the computer program can be an FPGA configuration.

In another general aspect, a computer security apparatus includes an electrical circuit having a first communications port, a second communications port, and a selection port, and configured to receive a selection signal at the selection port, wherein the selection signal has a first state and a second state, receive, at the first communications port, communications including information configured to alter operations of a processing system, block, based on the first state, the communications from passing from the first communications port to the second communications port, and pass, based on the second state, the communications from the first port to the second port.

Various implementations can include some, all, or none of the following features. The computer security apparatus can also include an input device in electrical communication with the selection port and configured to provide the first state and the second state based on a configuration of the input device. The input device can be in physical proximity to at least one of the electrical circuit and a computer system configured to communicate with the second communication port. The electrical circuit can be further configured to identify communications received at the first communications port as communications including information configured to alter operations of the processing system. The electrical circuit can be further configured to transmit, based on the first state, replies to communications received at the first communications port and including information configured to alter operations of the processing system. The third processor system can be a field programmable gate array (FPGA) device.

In another general aspect, a method for securing a computer system incudes determining a first operational condition, receiving, from a first processing system, a first communication including information configured to alter operations of a second processing system, blocking, based on the first operational condition, the first communication from being communicated to the second processing system, determining a second operational condition, receiving, from the first processing system, a second communication including information configured to alter operations of the second processing system, and allowing, based on the second operational condition, the second communication to be communicated to the second processing system.

Various implementations can include some, all, or none of the following features. The method can also include receiving, from the first processing system, a third communication having information not configured to alter operations of the second processing system, and allowing the third communication to be communicated to the second processing system in the first operational condition or the second operational condition. Determining the first operational condition can also include receiving a first user input indicative of a user selection of the first operational configuration, and wherein determining the second operational condition can also include receiving a second user input indicative of a user selection of the second operational configuration. The first user input can be based on actuation of a physical selector to a first mechanical configuration, and the second user input can be based on actuation of the physical selector to a second mechanical configuration. The operations can also include sending, based on the first operational condition, a third communication having a response to the first communication. The operations can also include determining that the first communication includes information configured to alter operations of the second processing system.

The systems and techniques described here may provide one or more of the following advantages. First, a system can provide resistance against disruption of controlled operations. Second, the system can resist malicious electronic attacks against controlled operations. Third, the system can act as a safeguard against unintended alterations to controlled operations.

The details of one or more implementations are set forth in the accompanying drawings and the description below. Other features and advantages will be apparent from the description and drawings, and from the claims.

DETAILED DESCRIPTION

This document describes systems and techniques for providing computer security, more specifically for securing computer hardware from malicious communications. In some examples, the computer system to be secured is used for mission-critical tasks that would be costly or dangerous if they were interfered with (e.g., machine controllers, banking systems, medical systems, infrastructure controllers). The use of the systems and techniques described in this document is not limited to only mission-critical systems; these systems and techniques can be used with any appropriate electronic system for which security can be implemented. Most, if not all, such systems are already protected by passwords to prevent unauthorized remote access. Passwords, however, can be stolen or guessed, and communication inputs can be overflowed in order to exploit latent software bugs and cause problems even when credentials are not available to the malicious user.

In general, and as will be described in more detail in subsequent paragraphs, security can be provided by separating electronic components of the system to be secured. Instead of using a single device to perform both communications and control functions (e.g., potentially allowing an attack on the communication port to provide access to the control functions), the work of the system is divided into at least three semi-independent subsystems that each perform a different function. In general, a communications subsystem handles external, potentially unsecured communications (e.g., network or Internet communications), a control subsystem handles the mission-critical process, and a gateway subsystem provides and monitors communications between the other two subsystems. The gateway subsystem selectably prevents or allows potentially sensitive communications (e.g., write commands) to pass from the communication side to the control side only when a hardware input (e.g., a physical selector, switch, or lock, that can be located near the controlling device) is temporarily engaged when access is needed, and then disengaged to return the system to a "safe" condition.

Figure 1:
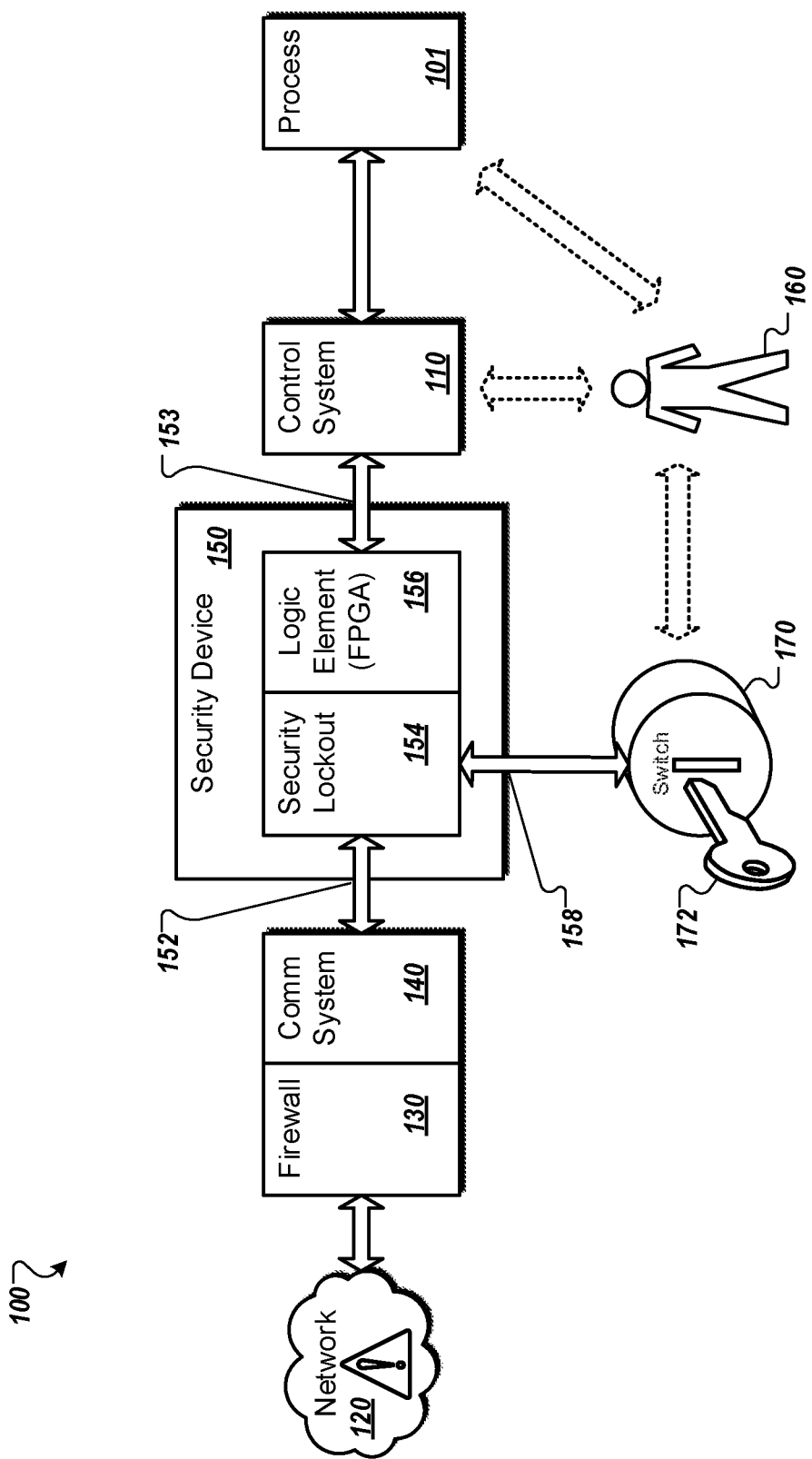
FIG. 1 is a block diagram of an example security system.

FIG. 1 is a block diagram of an example security system 100. In the illustrated example, a process 101 is controlled by a control system 110 (e.g., a processor system). In some embodiments, the process 101 can be a mission-critical process. For example, the process 101 can be a process that could cause danger or expense if it were to be disturbed by a careless or malicious user (e.g., a power turbine, life support system, reactor throttling, power grid controller, financial transaction engine), and the control system 110 can be configured to control the process (e.g., an industrial controller). In some embodiments, the process 101 can be a non-critical process.

The system 100 is in data communication with a network 120. In the illustrated example, the network 120 is a substantially unsecured network. For example, the system 100 may be in communication with the Internet or a telephone network (e.g., a landline and modem, a cellular modem) that may be available to the public. In another example, the network 120 can be a private local area network that is used both by persons who are authorized to access the system 100 (e.g., technicians, engineers, systems supervisors) and those who are not (e.g., office workers, marketing and accounting staff).

In previous systems, the control system would be in direct or near-direct communication with the network 120. In such previous systems, the process 101 would be under relatively greater risk of disruption and attack. For example, a malicious user could simply use a stolen password to gain privileged access to the control system. In another example, a malicious user could transmit patterns or volumes of data that were known to cause a disruption of or permit unauthorized access to the control system (e.g., hacking, overflows). Once the malicious user had access to the control system, the process 101 could be altered or interrupted.

In the illustrated example, the control system 110 is not in direct communication with the network 120. A communications firewall 130 and a communications system 140 are in direct communication with the network 120. The communications system 140 is a processor system (e.g., computer(s), processor(s)) that is configured to transmit and receive communications. The firewall 130 is configured to filter out certain types of known communications (e.g., blocking unused ports, filtering out irrelevant message types). In some embodiments, the firewall 130 can be a dedicated electronic device (e.g., a commercially available, off-the-shelf network firewall device). In some embodiments, the firewall can be a software process performed by the communications system 140.

Since the communications system 140 is exposed to the network 120, there is a chance that a malicious user could attack the communications system 140 and disrupt the operations of the communications system 140. However, since the communications system 140 is not directly responsible for controlling the process 101, a disruption of the communications system 140 will not have a direct impact upon the ability of the control system 110 to control the process 101.

Communication between the communications system 140 and the control system 110 passes through a security device 150. The communications system 140 is communicatively coupled to the security device 150 at a port 152, and the control system 110 is communicatively coupled to the security device 150 at a port 153. The communications system 140 includes a security lockout 154 and a logic element 156. The logic element 156 is a processing system that is configured to operate in two different modes or configurations.

In a "sensitive" (e.g., unlocked, unblocked, read-write) mode, some or all communications originating from the network 120 are passed along to the control system 110. For example, in the "sensitive" mode the logic element 156 may identify "write" commands or any other type of command that can alter the configuration or operation of the control system 110, and relay them on to the control system 110. In another example, in the "sensitive" mode the logic element 156 may simply connect a communications circuit between the port 152 and the port 153 to allow communication to pass uninterrupted. In use, the "sensitive" mode may be engaged when the control system 110 is to be given an updated configuration, a software or firmware update, a recalibration, or any other appropriate command that can affect the operation of the process 101.

In a "safe" (e.g., locked, blocked, read-only) mode, some or all communications originating from the network 120 are blocked from being passed along to the control system 110. For example, in the "safe" mode the logic element 156 may identify and block "write" commands or any other type of command that can alter the configuration or operation of the control system 110. In another example, in the "safe" mode the logic element 156 may also block communications that would illicit a response from the control system 110 and divert computing power away from the process 101 (e.g., as a way to block denial-of-service or overflow attacks). In some embodiments, the logic element 156 may be configured to allow "read only" commands to be passed on to the control system 110 even in the "safe" mode. In another example, in the "safe" mode the logic element 156 may simply disconnect a communications circuit between the port 152 and the port 153 to prevent communication from passing between the communications system 140 and the control system 110.

The logic element 156 is also configured to respond to communications that are disallowed while in the "safe" mode. For example, when a remote system attempts to send a "write" command during "safe" mode, the logic element 156 can identify the command as being disallowed, and send a response to the remote system to indicate that the command is not allowed (e.g., "error, the request cannot be completed while system is in safe mode").

The logic element 156 is also configured to respond to some predetermined types of incoming communications. For example, the logic element 156 is configured to request or receive periodic updates from the control system 110 (e.g., process values) at a rate that has a known, expected impact upon the ability control system 110 to control the process 101. The logic element 156 may buffer those updates and provide them in response to intercepted requests for such information from the control system 110.

The logic element 156 operates in the "safe" and "sensitive" modes based on input from the security lockout module 154. The security lockout module 154 provides an input port 158 that receives a user input from an authorized user 160. In some implementations, the input port 158 can be a communications port (e.g., USB, RS232, BLUETOOTH) that is communicatively coupled to an electronic user input device (e.g., a mouse, a keyboard, a touchscreen, a graphical user interface) to receive a selection of the "safe" mode (e.g., first mode) or the "sensitive" mode (e.g., second mode) from the user 160. For example, the authorized user 160 may press a virtual button on a touch-sensitive display screen to switch the modes, and that selection can be received at the input port 158 and can be interpreted by the security lockout module 154, and the interpreted selection can be provided to the logic element 156 to cause the security device 150 operate in the selected mode.

In some implementations, the input port 158 can be an electrical port that is electrically coupled to a physical user input device (e.g., a button, a keyed lockout, a selector switch) to receive a selection of the "safe" mode (e.g., first mode) or the "sensitive" mode (e.g., second mode) from the authorized user 160. In the illustrated example, the authorized user 160 can insert a key 172 into a switch 170 and rotate the switch from a "safe" (first) switch position to a "sensitive" (second) switch position to open or close an electric circuit in a binary manner, and that binary circuit can include the input port 158 and can be interpreted by the security lockout module 154, and the interpreted selection can be provided to the logic element 156 to cause the security device 150 to operate in the selected mode. In some embodiments, the switch 170 may omit the need for the key 172 (e.g., the switch 170 is just a button or toggle type selector switch, and physical security may be provided by a locked door to the room that the switch 170 is in). In some implementations, the signal provided to the input port 158 can be provided by any appropriate source of a selector signal (e.g., a TTL or CMOS logic level source).

In operation, the security device 150 is generally left in the "safe" mode configuration. As such, the control system 110 and the process 101 are protected by default alteration by commands from the network 120. When the control system 110 legitimately needs to be altered or updated, the authorized user 160 can actuate the switch 170 from a "safe" selection to a "sensitive" selection to cause the security device 150 to switch into the "sensitive" mode of operation temporarily. While temporarily in the "sensitive" mode, the authorized user 160 or another authorized user can provide commands to the control system 110 across the network 120 and through the communications system 140 and security device 150. When the updates are complete, the authorized user 160 can actuate the switch 170 to cause the security device 150 to return to the "safe" mode configuration.

Security for the system 100 is further enhanced by the physical arrangement and placement of the security device 150, the switch 170, and/or the control system 110. For example, the process 101 may occur at a remote location, and the control system 110 may be collocated remotely in order to control the process 101. If the control system 110 were configured to be updated remotely, then the process 101 may develop an error that is not immediately detectable from the remote location. If the security system 150 were configured to be switched remotely, then a malicious user may have an increased opportunity to probe the security lockout 154 from a remote location. Either or both of these problems can be mitigated by collocating and physically securing the security device 150, the switch 170, and the control system 110 in physical proximity to each other.

For example, by placing the switch 170, the security device 150, and the control system 110 together within the same physically secure space (e.g., a lockable building, a lockable panel, a guarded location), the authorized user 160 (who is presumed to pose no risk to the process 101) can gain access to the secure space and actuate the switch or gain direct physical access to the control system, whereas a malicious user could not. In another example, by placing the switch 170, the security device 150, and the control system 110 together in physical proximity to the process 101, the authorized user 160 would have to be in physical proximity to the process 101 and/or the control system 110 in order to actuate the switch 170 and allow updates to be made to the control system 110. As such, the authorized user 160 is inherently physically present to sense problems or changes in the process 101, and possibly take emergency (e.g., manual shutdown) or remedial (e.g., observe, report, diagnose, repair) actions.

The logic element 156 includes one or more processing circuits. In some embodiments, the logic element 156 can be a traditional (e.g., von Neumann architecture) central processing unit (CPU). In some embodiments, the logic element 156 can be based on the architecture of a graphics processing unit, a video processing unit, a tensor processing unit, a neural processing unit, a physics processing unit, a digital signal processor (DSP), an image signal processor, or a synergistic processing element.

Figure 2:
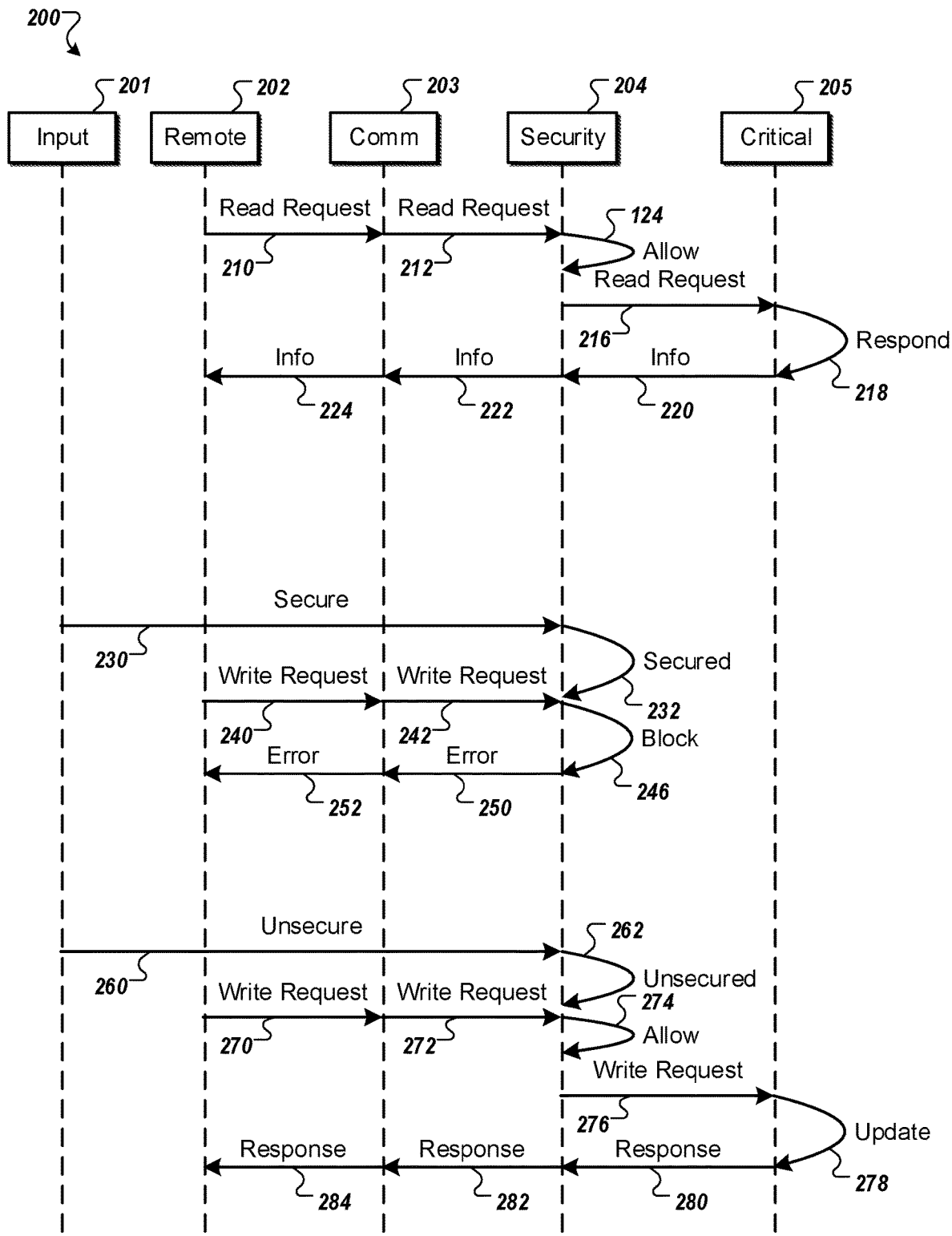
FIG. 2 is a timeline diagram of example communications.

The logic element 156 executes program instructions that are configured to resist modification in situ. Examples of logic elements that are resistant to modification in situ include Application Specific Integrated Circuit (ASIC), Complex Programmable Logic Device (CPLD), and Field Programmable Gate Array (FPGA). In some embodiments, the logic element 156 can be an FPGA device. For example, an FPGA chosen because under typical operating conditions the FPGA cannot be reprogrammed in situ, but can be removed and reprogrammed if changes to its program become necessary. Additionally, the FPGA can be programmed to provide substantially parallel processing paths in the same device, as well as provide a high rate of throughput. FIG. 2 is a timeline diagram of example communications process 200. In some implementations, the process 200 can be an example of communications that can be performed using the example system 100 of FIG. 1.

A read request 210 is sent by a remote communication system 202. In the illustrated example, the read request 210 is intended to obtain information from a mission-critical system 205. In some implementations, the read request 210 can be sent by a remote computer, across the example network 120 of FIG. 1.

The read request 210 is received by a communication system 203. For example, communications from the example network 120 can be received by the communications system 140. The communication system 203 transforms the read request 210 into a read request 212 that is in a format that can be received by a security device 204 (e.g., the example security device 150). For example, the communication system 203 may be configured to receive messages, such as the read request 210, in an Ethernet protocol, and translate them to messages, such as the read request 212, on a peripheral connect interface (PCI) bus format or a universal serial bus (USB) format.

The security device 204 inspects the read request and allows 124 the request to be relayed as a read request 216 to the mission-critical system 205. For example, the security device 204 can inspect the read request 212 and determine that the communication is a requesting a read-only operation that would be safe to relay onward, since the request 212 would not alter the operation of the mission-critical system 205. The communication system 203 is configured for bi-directional transformation of communications.

In some implementations, the security device 204 may perform protocol translation. For example, a malicious user may learn that the operating system of the mission-critical system 205 has a flaw that can be exploited by using a specifically formatted or timed message. The security device 204 can be configured to send only a set of specifically formatted and/or timed messages to the mission-critical system 205, based on communications received by the security device 204.

For example, the mission-critical system 205 may be configured to accept requests that are at most 128 bytes long, but an exploitable flaw in the mission-critical system 205 may cause a buffer overflow if a 129 byte message were to be received. As an extra layer of protection, the security device 204 may be configured to transmit only a maximum of 128 bytes, regardless of the length of the (potentially malicious) external request. In some examples, the security device 204 may truncate the message to the expected 128 byte maximum. In some examples, the security device 204 may identify such malformed requests and not relay them on to the mission-critical system 205. The security device 204 may also respond to the remote system 202 with an error message, and/or may transmit an alarm to a supervisory system to alert authorized users that the system may be under attack.

In another example, the mission-critical system 205 may be configured to respond to the commands "read( )" and "write( )" and ignore anything else. However, these commands may potentially be used to exploit an unknown weakness in the mission-critical system 205. In such an example, instead of being configured to directly pass "read( )" and "write( )" commands from the remote system 202 (e.g., which could allow malicious forms of these commands to be passed from the remote system 202), the security device 204 may expose a completely different protocol that implements different commands, such as "request( )" and "update( )". When a "request(x, y, z)" command is received by the security device 204, the command may be translated by the security device into "read (x)", "read(y)", and "read(z)" commands that are sent to the mission-critical system 205 at a predetermined, known-safe transmission rate.

The mission-critical system 205 responds to the read request 216 by sending an information message 220 to the security device 204. The security device 204 relays the information as an information message 222 (e.g., possibly performing protocol translation in the process) to the communication system 203. The communication system 202 performs protocol translation to send the message 222 as an information message 224 to the remote system 202.

A user input 230 is received by the security device 204 from a user input 201. For example, the user 160 can actuate the example switch 170 to send a message or alter the state of a circuit to the security device 150. The security device 204 responds to the user input 230 by placing itself into a secured (e.g., safe, locked, blocking, read-only) mode 232.

The remote system 202 sends a write request 240 to the communication system 203, which in turn sends a corresponding write request 242 to the security device 204.

The security device 204 receives the write request 242 and identifies it as a communication type that is not permitted to be relayed on to the mission-critical system 205 while in the secured mode 232. Since the security device 204 is in the secured mode 232, the write request 242 is blocked 246.

In response, the security device 204 sends an error message 250 to the communication system 203, which in turn sends an error message 252 to the remote system 202. For example, the error messages 250 and 252 may convey information that explains that the write request 240 could not be honored because the security device 204 is in the secured mode 232. In some implementations in which the write request 240 was not malicious in nature (e.g., an authorized user making a legitimate write request simply forgot to unlock the security device 204), the error message can act as a reminder to an authorized user that the user input 201 needs to be used to change the security configuration of the security device 204 before the mission-critical system 205 can be altered.

A user input 260 is received by the security device 204 from the user input 201. For example, the user 160 can actuate the example switch 170 to send a message or alter the state of a circuit to the security device 150. The security device 204 responds to the user input 260 by placing itself into an unsecured (e.g., sensitive, unlocked, read-write) mode 262.

The remote system 202 sends a write request 270 to the communication system 203, which in turn sends a corresponding write request 272 to the security device 204.

The security device 204 receives the write request 272 and identifies it as a communication type that is permitted to be relayed on to the mission-critical system 205 while in the secured mode 262. Since the security device 204 is in the unsecured mode 262, the write request 242 is allowed 274 and is relayed to the mission-critical system 205 as a write request 276.

The mission-critical system 205 performs an update 278 based on the write request 276, and then sends a response 280 to the security device 204. The security device 204 relays the response 280 on to the communication system 203 as a response 282, which in turn sends a corresponding response 284 to the remote system 202. For example, the mission-critical system 205 can send a confirmation to the remote system 202 that the requested operation has been completed.

Figure 3:
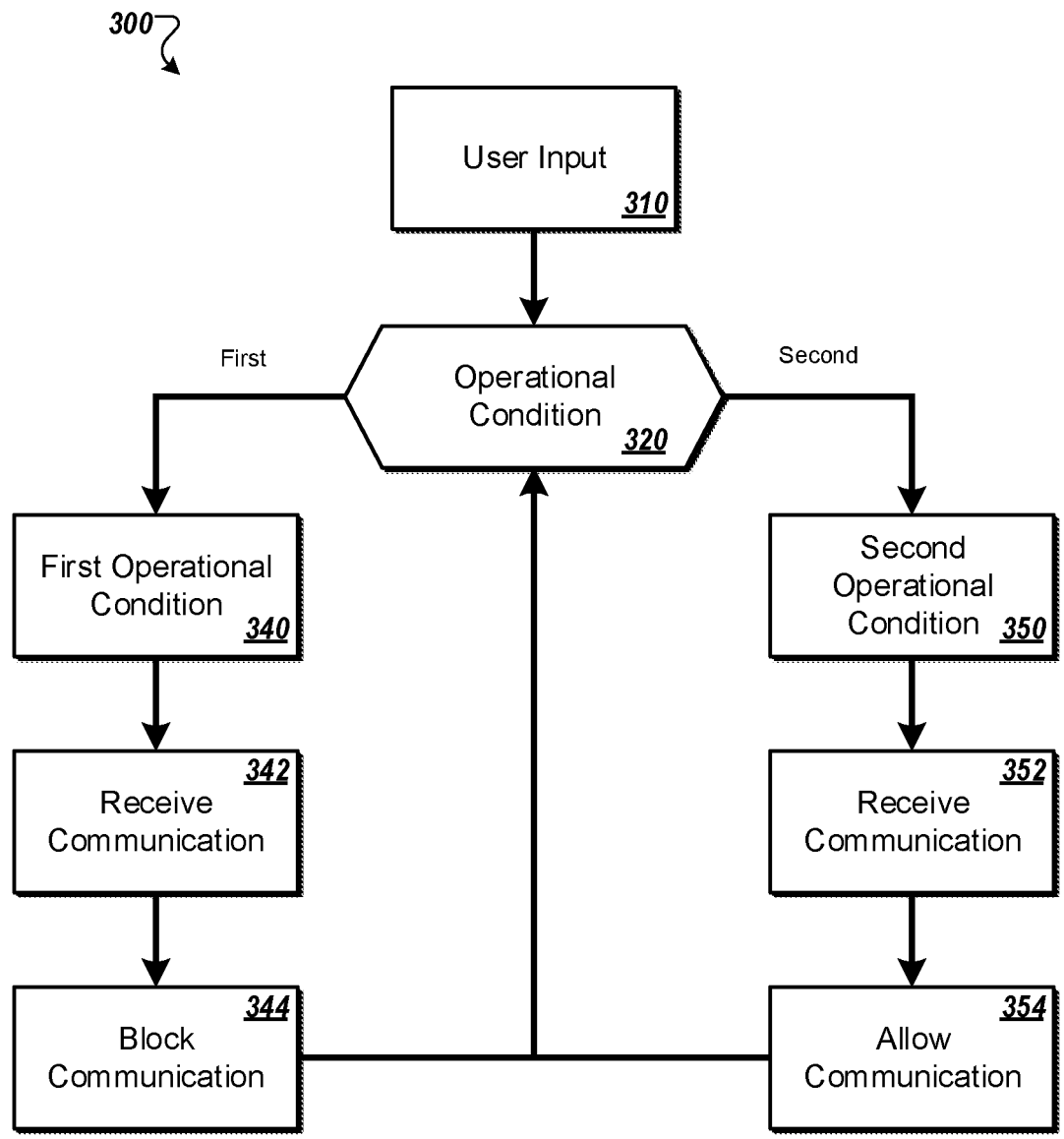
FIG. 3 is a flow diagram of an example process.

FIG. 3 is a flow diagram of an example process 300. In some implementations, the process 300 can be performed by part or all of the example system 100 of FIG. 1. In some implementations, the process 300 can be performed by the example security device 204 of FIG. 2.

At 310, a user input is received. For example, the user 160 can actuate the example switch 170 to switch modes between a first operational condition (e.g., "safe", "locked", "secured") and a second operational condition (e.g., "sensitive", "unlocked").

At 320, a first operational condition is determined. In some implementations, determining the first operational condition also includes receiving a first user input indicative of a user selection of the first operational configuration, and wherein determining the second operational condition includes receiving a second user input indicative of a user selection of the second operational configuration. For example, the security device 150 can determine, based on the user input signal received at the port 158, that the user 160 has actuated the switch 170 to place the system 100 into a "safe" mode. If the first operational condition is determined, then the process 300 continues at 340.

In some implementations, the user input can be based on actuation of a physical switch to a first mechanical configuration, and the second user input can be based on actuation of the physical switch to a second mechanical configuration. For example, the switch 170 can be rotated between two physical switch positions representing "safe" and "secure". In some embodiments, the switch 170 can be an electrical switch that can be latched or momentarily configured from the "safe" position to the "sensitive" mode (and back). In some implementations, the user input can be an electronic input, such as an electronic signal or communication received as a result of the user 160 interacting with a graphical user interface, a voice response system, a short messaging system (SMS) based interface, or any other appropriate form of user input apparatus.

At 342, a first communication including information configured to alter operations of a second processing system is received from a first processing system. For example, the remote system 202 can send the write request 240 that is meant to alter the mission-critical system 205 in some manner, and the write request 240 can be received by the security device 204 as the write request 242.

In some implementations, the process 300 can also include determining that the first communication includes information configured to alter operations of the second processing system. For example, the security device 150 can be configured to inspect incoming communications to determine if they are commands such as "write", "reset", "shutdown", "reboot", or other types of commands that can cause a system to respond by changing its operation in some manner.

At 344, the first communication is blocked from being communicated to the second processing system based on the first operational condition. For example, the security device 204 can be secured 232, and as a result, the write request 242 can be blocked 246.

In some implementations, the operations can also include sending, based on the first operational condition, a third communication comprising a response to the first communication. For example, the security system 204 can send the error message 250 in response to blocking 246 the write request 242.

If at 320 a second operational condition is determined, then the process 300 continues at 350. For example, the security device 150 can determine, based on the user input signal received at the port 158, that the user 160 has actuated the switch 170 to place the system 100 into a "sensitive" mode.

At 352, a second communication including information configured to alter operations of the second processing system is received from the first processing system. For example, the remote system 202 can send the write request 270 that is meant to alter the mission-critical system 205 in some manner, and the write request 270 can be received by the security device 204 as the write request 272.

At 354, the second communication is allowed to be communicated to the second processing system based on the second operational condition. For example, the security device 204 can be unsecured 262, and as a result, the write request 272 can be relayed to the mission-critical system 205 at the write request 276.

In some implementations, the process 300 can also include receiving, from the first processing system, a third communication including information not configured to alter operations of the second processing system, and allowing the third communication to be communicated to the second processing system in the first operational condition or the second operational condition. For example, the remote system 202 can send the read request 210, which the security device 204 can receive as the read request 212 and identify the read request 212 as a communication that will not affect the operation of the mission-critical system 205, and relay the communication to the mission-critical system 205 as the read request 216.

In some implementations, the data processing apparatus can be a field-programmable gate array (FPGA) device, and the computer program can be an FPGA configuration.

Figure 4:
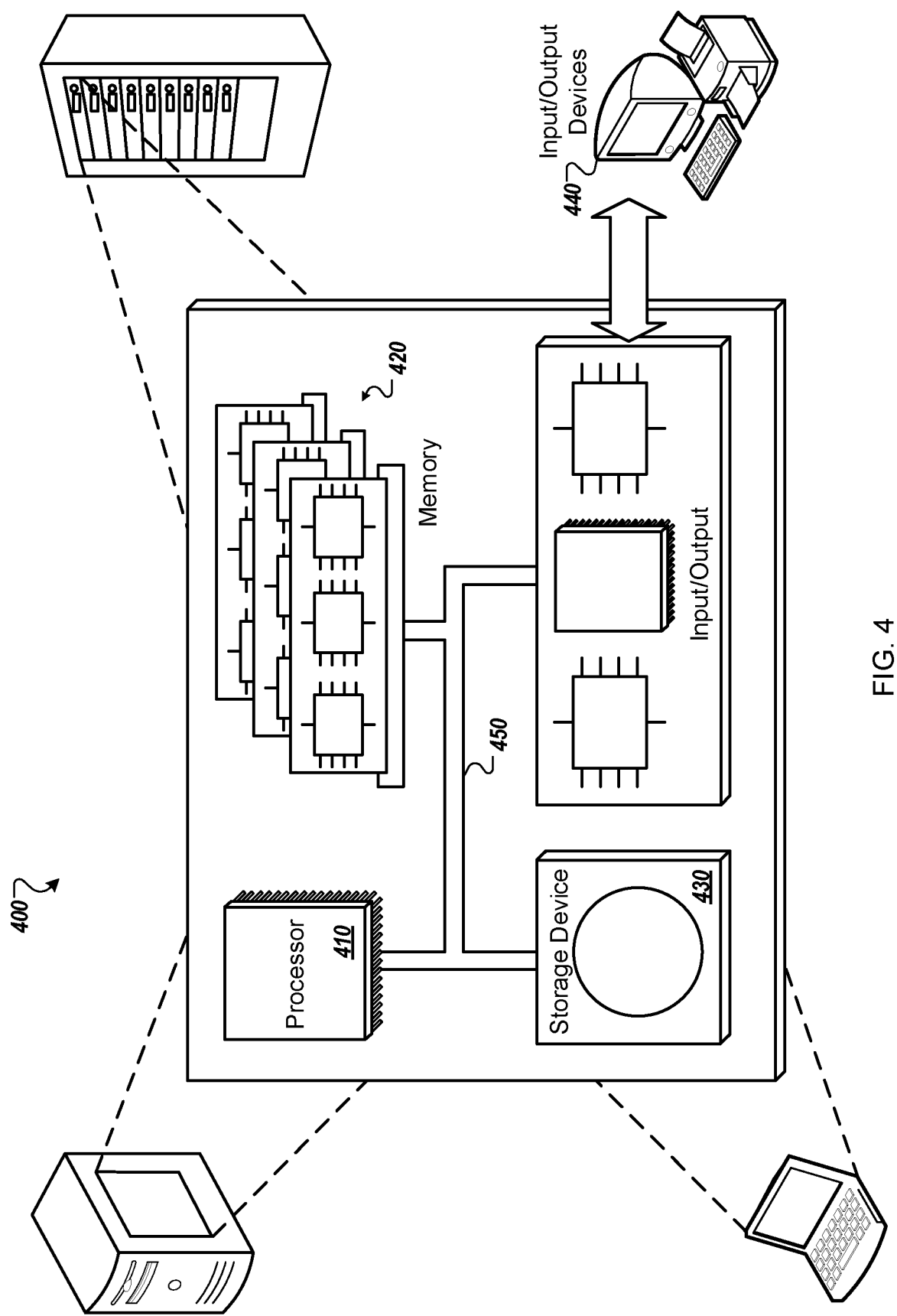
FIG. 4 is a schematic diagram of an example of a generic computer system.

FIG. 4 is a schematic diagram of an example of a generic computer system 400. The system 400 can be used for the operations described in association with the method 300 according to one implementation. For example, the system 400 may be included in either or all of the example firewall 130, the example communication system 140, the example security device 150, the example control system 110, or the example process 101 of FIG. 1, or the example remote system 202, the example communication system 202, the example security system 204, or the example, mission-critical system 205 of FIG. 2.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440. In some implementations, the processor 410 can be an FPGA.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   a first processor system configured to communicate with a network;
   a second processor system configured to control a process; and
   a third processor system comprising a physical selector configured as a user input, arranged as a communications relay between the first processor system and the second processor system and configured to determine a physical configuration of the user input and selectively operate in a first configuration and a second configuration based on the physical configuration of the user input, wherein the third processor system is configured to identify communications comprising information configured to alter operations of the second processor system and selectively block relay of predetermined types of communications from the first processor system to the second processor system in the first configuration, and the third processor system is configured to relay the predetermined types of communications from the first processor system to the second processor system in the second configuration; wherein the third processor system comprises a field programmable gate array (FPGA) device.

2. The computer system of claim 1, wherein the physical selector is in electrical communication with the third processor system.

3. The computer system of claim 1, wherein the user input is located in physical proximity to the at least one of the second processor system and the third processor system.

4. The computer system of claim 1, wherein the predetermined types of communications comprise communications that can cause a change in operations of the second processor system.

5. The computer system of claim 1, wherein the third processor system is further configured to reply to the predetermined types of communications when operating in the first configuration.

6. A non-transitory computer storage medium encoded with a computer program, the computer program comprising instructions that when executed by a data processing apparatus cause the data processing apparatus to perform operations comprising:
   receiving a first user input indicative of a user selection of a first mechanical configuration;
   determining, by the data processing apparatus, a first operational condition based on the first mechanical configuration of a physical selector;
   receiving, by the data processing apparatus and from a first processing system, a first communication comprising information configured to alter operations of a second processing system;
   blocking, by the data processing apparatus and based on the first operational condition, relay of the first communication by the data processing apparatus to the second processing system;
   receiving a second user input indicative of a user selection of a second mechanical configuration of the physical selector;
   determining, by the data processing apparatus, a second operational condition based on the second mechanical configuration of the physical selector;
   receiving, by the data processing apparatus and from the first processing system, a second communication comprising information configured to alter operations of the second processing system; and
   relaying, by the data processing apparatus and based on the second operational condition, the second communication to the second processing system.

7. The non-transitory computer storage medium of claim 6, the operations further comprising:
   receiving, by the data processing apparatus and from the first processing system, a third communication comprising information not configured to alter operations of the second processing system; and
   relaying, by the data processing apparatus, the third communication to the second processing system in the first operational condition or the second operational condition.

8. The non-transitory computer storage medium of claim 6, wherein the first user input is based on actuation of the physical selector to the first mechanical configuration, and the second user input is based on actuation of the physical selector to the second mechanical configuration.

9. The non-transitory computer storage medium of claim 6, the operations further comprising sending, based on the first operational condition, a third communication comprising a response to the first communication.

10. The non-transitory computer storage medium of claim 6, the operations further comprising determining that the first communication comprises information configured to alter operations of the second processing system.

11. The non-transitory computer storage medium of claim 6, wherein the data processing apparatus comprises a field-programmable gate array (FPGA) device, and the computer program comprises an FPGA configuration.

12. A computer security apparatus comprising:
   an electrical circuit comprising a processor, a first communications port, a second communications port, and a selection port, and a physical selector in electrical communication with the selection port and configured to provide a first state based on a first physical configuration of the physical selector and provide a second state based on a second physical configuration of the physical selector, and configured to:
      receive, by the processor, a selection signal at the selection port, wherein the selection signal comprises the first state indicative of the first physical configuration of the physical selector and the second state indicative of the second physical configuration of the physical selector;
      receive, by the processor at the first communications port, communications comprising information configured to alter operations of a processing system;
      block, by the processor and based on the first state, relay of the communications by the processor from the first communications port to the second communications port; and relay, by the processor and based on the second state, the communications from the first communications port to the second communications port.

13. The computer security apparatus of claim 12, wherein the physical selector is in physical proximity to at least one of the electrical circuit and a computer system configured to communicate with the second communication port.

14. The computer security apparatus of claim 12, wherein the electrical circuit is further configured to identify communications received at the first communications port as communications comprising information configured to alter operations of the processing system.

15. The computer security apparatus of claim 12, wherein the electrical circuit is further configured to transmit, based on the first state, replies to communications received at the first communications port and comprising information configured to alter operations of the processing system.

16. The computer security apparatus of claim 12, wherein the processor comprises a field programmable gate array (FPGA) device.

17. A method for securing a computer system, the method comprising:
  receiving a first user input indicative of a user selection of a first mechanical configuration of a physical selector;
  determining, by a first processing system, a first operational condition based on the first mechanical configuration of the physical selector;
  receiving, by the first processing system and from a second processing system, a first communication comprising information configured to alter operations of a third processing system;
  blocking, by the first processing system and based on the first operational condition, the first communication from being relayed by the first processing system to the third processing system;
  receiving a second user input indicative of a user selection of a second mechanical configuration of the physical selector;
  determining a second operational condition based on the second mechanical configuration of the physical selector;
  receiving, from the second processing system, a second communication comprising information configured to alter operations of the third processing system; and
  relaying, by the first processing system and based on the second operational condition, the second communication to the third processing system.

18. The method of claim 17, further comprising:
  receiving, by the first processing system and from the second processing system, a third communication comprising information not configured to alter operations of the third processing system; and
  relaying, by the first processing system, the third communication to the third processing system in the first operational condition or the second operational condition.

19. The method of claim 17, wherein the first user input is based on actuation of the physical selector to the first mechanical configuration, and the second user input is based on actuation of the physical selector to the second mechanical configuration.

20. The method of claim 17, the operations further comprising sending, based on the first operational condition, a third communication comprising a response to the first communication.

21. The method of claim 17, the operations further comprising determining that the first communication comprises information configured to alter operations of the third processing system.

* * * * *